United States Patent
Urbanek

(10) Patent No.: US 8,260,281 B2
(45) Date of Patent: Sep. 4, 2012

(54) SYSTEM AND METHOD OF WIRELESS COMMUNICATION

(75) Inventor: Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 78 days.

(21) Appl. No.: 12/962,620

(22) Filed: Dec. 7, 2010

(65) Prior Publication Data

US 2012/0142327 A1 Jun. 7, 2012

(51) Int. Cl.
*H04M 3/00* (2006.01)

(52) U.S. Cl. ........ 455/418; 455/419; 455/420; 455/517; 455/550.1; 455/551; 455/556.2; 455/557; 455/558

(58) Field of Classification Search .......... 455/418–419, 455/420, 517, 550.1, 551, 556.2
See application file for complete search history.

(56) References Cited

U.S. PATENT DOCUMENTS

| | | | |
|---|---|---|---|
| 7,266,371 B1 * | 9/2007 | Amin et al. ................... | 455/419 |
| 7,493,111 B2 | 2/2009 | Knowles | |
| 2007/0099599 A1 | 5/2007 | Smith et al. | |
| 2009/0093242 A1 | 4/2009 | Bhalekar et al. | |
| 2010/0136960 A1 | 6/2010 | Knezevic | |
| 2010/0167696 A1 | 7/2010 | Smith et al. | |
| 2010/0222047 A1 | 9/2010 | Vanderlinden et al. | |
| 2011/0030062 A1 | 2/2011 | Hsu et al. | |

OTHER PUBLICATIONS

Foreign Communication from a Related Counterpart Application—International Search Report and Written Opinion, PCT/US2011/63736, Feb. 29, 2012.

* cited by examiner

*Primary Examiner* — Kiet Doan
*Assistant Examiner* — Michael T Vu

(57) ABSTRACT

A method of providing wireless communication service to a mobile phone is provided. The method comprises identifying common mobile phone applications and selectively supported mobile phone applications, installing the common mobile phone applications and the selectively supported mobile phone applications in read only memory of the mobile phone, each of the selectively supported applications associated with a selection switch initially disabled. The method further comprises, when activating the mobile phone, enabling at least one of the selection switches and writing at least one reference to branded content to a random access memory of the mobile phone based on a service plan associated with the mobile phone.

15 Claims, 7 Drawing Sheets

SYSTEM AND METHOD OF WIRELESS COMMUNICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. Electronic devices may be associated with an electronic serial number (ESN), a stock keeping unit (SKU), and other identifying information. Electronic devices may be packaged with operating manuals, warning documents, charging devices, and other accessories in a point-of-sale package suitable for distributing to end users. A plurality of point-of-sale packages, each containing an electronic device, may be shipped together to a retail store or business location. Electronic devices may be configured prior to shipping with unique packaging, hardware and software branding, features and functionality.

SUMMARY

In an embodiment, a method of providing wireless communication services to a mobile phone is disclosed. The method comprises identifying a first plurality of embedded applications employed by both a first branded mobile phone model and a second branded mobile phone model, where both the first branded mobile phone model and the second branded mobile phone model are based on the same generic mobile phone. The method further comprises identifying a second plurality of embedded applications employed by the first branded mobile phone model and not employed by the second branded mobile phone model, instructing a manufacturer of the generic mobile phone to install the first plurality of embedded applications in a read only memory (ROM) of the generic mobile phone, and instructing the manufacturer of the generic mobile phone to install the second plurality of embedded applications in the read only memory of the generic mobile phone, wherein the functionality of the second plurality of embedded applications is enabled based on at least one writable parameter in a random access memory (RAM) of the generic mobile phone. The method further comprises instructing the manufacturer of the generic mobile phone to install embedded logic in the read only memory of the generic mobile phone that reads from a first location in the random access memory of the generic mobile phone to obtain a reference to content to be rendered by the embedded logic, activating a first mobile phone, wherein the mobile phone is the first branded mobile phone model, and in response to activating the first mobile phone, writing over-the-air a first reference to content to the first location in the random access memory of the first mobile phone, wherein the first mobile phone is differentiated in conformance with the first branded mobile phone model.

In an embodiment, a method of providing wireless communication services to a mobile phone is disclosed. The method comprises instructing a manufacturer of a generic mobile phone to install a firmware on the generic mobile phones, wherein the generic mobile phone is certified based on the firmware and based on an execution platform installed on the generic mobile phone, certifying a first content for use by the execution platform, and certifying a second content for use by the execution platform, The method further comprises activating a first mobile phone, wherein the first mobile phone is one of the generic mobile phones. In response to activating the first mobile phone, automatically identifying a first service brand associated with the first mobile phone, and based on the first service brand, writing over-the-air a reference to the first content to a first memory area of the first mobile device. The method further comprises activating a second mobile phone, wherein the second mobile phone is one of the generic mobile phones, and in response to activating the second mobile phone, automatically identifying a second service brand associated with the second mobile phone, and based on the second service brand, writing over-the-air a reference to the second content to a second memory area of the second mobile device.

In an embodiment, a service awareness provisioning server is disclosed. The server comprises at least one processor, a memory, and an application stored in memory that, when executed by the at least one processor, receives a first activation message from a first mobile phone, the first mobile phone being one of a plurality of generic mobile phones. In response to the first activation message, the server identifies a first service brand associated with the first mobile phone, and based on the first service brand, writes a reference to a first content to a memory of the first mobile phone over-the-air, wherein the first content is one of a first turn-on splash screen associated with the first service brand, a first turn-on tone associated with the first service brand, a first turn-off splash screen associated with the first service brand, a first turn-off tone associated with the first service brand, a reference to a first voice mail service associated with the first service brand, and a universal reference locator (URL) of an on-line store associated with the first service brand. The server receives a second activation message from a second mobile phone, the second mobile phone being one of a plurality of generic mobile phones, and in response to the second activation message, identifies a second service brand associated with the second mobile phone, and based on the second service brand, writes a reference to a second content to a memory of the second mobile phone over-the-air, wherein the second content is one of a second turn-on splash screen associated with the second service brand, a second turn-on tone associated with the second service brand, a second turn-off splash screen associated with the second service brand, a second turn-off tone associated with the second service brand, a reference to a second voice mail service associated with the second service brand, and a universal reference locator (URL) of an on-line store associated with the second service brand.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method for generic device configurations for portable electronic devices is described. Unique device configurations for each model, brand, and even color of a portable electronic device lead to separate stock keeping units (SKUs) for each distinct product that can be purchased, introducing complexity to inventory management and distribution. These unique configurations also manifest themselves in the features and embedded applications that are delivered as part of the firmware of the portable electronic devices. Each different combination of features and applications, for example, may entail extensive testing and certification, thereby creating a large overhead cost in addition to the actual hardware costs of the portable electronic devices. To reduce the need for unique configurations, analysis is performed to identify which applications are used across multiple versions of a mobile phone model, regardless of branding or customization, and to package these embedded applications in the firmware delivered with the a generic mobile phone. In some contexts, this firmware may be referred to as generic firmware. Any embedded applications that are not used by all versions may be turned on or off in order to be packaged in the generic firmware. This will allow an original equipment manufacturer (OEM) to deliver an out of the box default configuration with minimal or no branding. The service provider may then, through an enhanced provisioning process, add branding and customization as needed at the time of service activation.

In an embodiment, firmware may be stored in a read only memory (ROM) of the portable electronic device such that the firmware is not readily altered or over written by general users of the portable electronic device. Typically, general users of a portable electronic device may be prevented from readily altering, deleting, and/or downloading firmware to the portable electronic device to avoid compromising the basic function of the portable electronic device. Firmware may be contrasted with configuration data which in some cases may be readily written into, changed in, or deleted from a memory of the portable electronic device by a user, for example by using an interface for configuring the device and/or applications. Additionally, firmware may be contrasted with applications that may be downloaded to, stored on, executed on, and deleted from the portable electronic device by a user.

Figure 1:
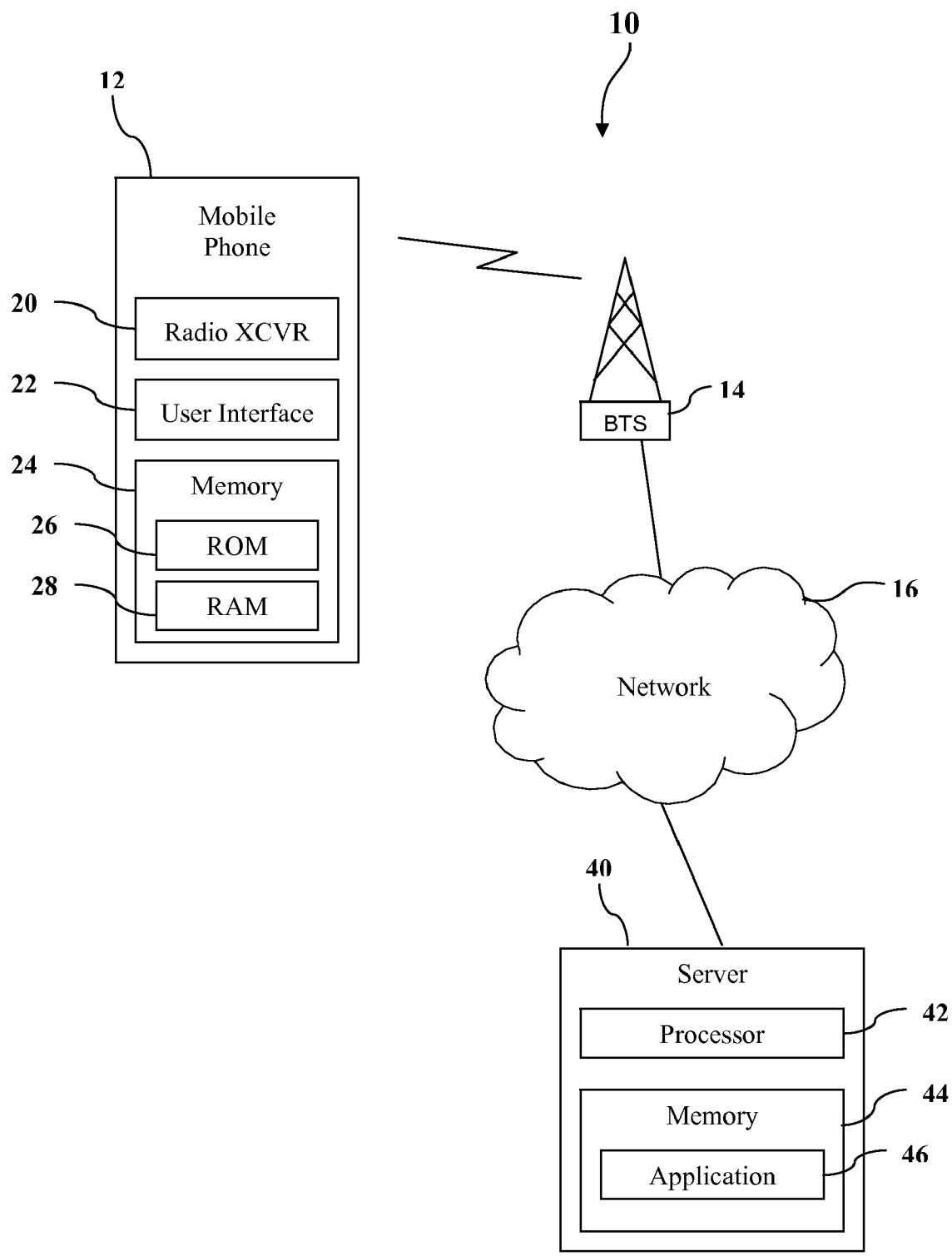
FIG. 1 is a block diagram of a provisioning system according to an embodiment of the disclosure.

Turning now to FIG. 1, a communication system 10 is described. The system 10 comprises a mobile phone 12, a base transceiver station (BTS) 14, a network 16, and a service awareness provisioning server 40. The mobile phone 12 may be a mobile phone, a personal digital assistant (PDA), a media player, or other communication enabled portable electronic device. In an embodiment, the mobile phone 12 may be implemented as a handset. Details of handsets are discussed further hereinafter. The base transceiver station 14 provides a communication link to the mobile phone 12 and couples the mobile phone 12 to the network 16. In an embodiment, the base transceiver station 14 provides a wireless communication link to the mobile phone 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 14 is illustrated in FIG. 1, it is understood that the communication system 10 may comprise any number of base transceiver stations 14 and any number of mobile phones 12. The network 16 may be a public communication network, a private communication network, or a combination thereof.

The mobile phone 12 may comprise a radio transceiver 20, a first user interface 22, and a first memory 24. Alternatively, the mobile phone 12 may comprise two or more radio transceivers 20. The first memory 24 may comprise a first read only memory (ROM) 26, and a first random access memory (RAM) 28. The service awareness provisioning server 40 may comprise a processor 42, a memory 44, and an application 46 stored in the memory 44. The service awareness provisioning server 40 may also comprise a plurality of processors located in a plurality of computers. Computers are discussed in more detail hereinafter.

The application 46, when executed by a processor 42 of the service awareness provisioning server 40, may receive a first activation message from a first mobile phone 12, the mobile phone 12 being one of a plurality of generic mobile phones 12. In response to the first activation message, the application 46 identifies a first service brand associated with the first mobile phone 12, and based on the first service brand, a reference to a first content is written over-the-air to a first random access memory 28 of the first mobile phone 12. The application 46 may link the first service brand to the first mobile phone 12 by looking up in a data store (not shown) a wireless communication service provisioned for the first mobile phone 12 using a phone number of the first mobile phone 12, an electronic serial number (ESN) of the first mobile phone 12, a mobile subscriber number (MSN) of the first mobile phone 12, other identifying information of the first mobile phone 12, and/or combinations thereof.

The first content identified by the reference may be one or more of a first turn-on splash screen associated with the first service brand, a first turn-on tone associated with the first service brand, a first turn-off splash screen associated with the first service brand, a first turn-off tone associated with the first service brand, a phone number of a first voice mail service associated with the first service brand, a short-code that references the first voice mail service, another reference and/or address to the first voice mail service, and a universal reference locator (URL) of an on-line store associated with the first service brand. One or more of the referenced content may be stored in the first random access memory 28 of the first mobile phone 12. In some contexts, the phone number of a voice mail service may be referred to as a dial-up number. Alternatively, one or more of the referenced content may be stored elsewhere and accessible by the first mobile phone 12 via the base transceiver station 14 and the network 16. In operation, the first mobile phone 12 uses the references to present content. For example, when the first mobile phone 12 performs a power-on boot, the first mobile phone 12 goes to the location in the first random access memory 28 allocated to containing the reference for the turn-on splash screen, follows the reference to the turn-on splash screen content, retrieves the content, and presents the content as the turn-on splash screen.

The application 46 may then receive a second activation message from a second mobile phone 12, the second mobile phone 12 being one of a plurality of generic mobile phones 12. In response to the second activation message, the application 46 identifies a second service brand associated with the second mobile phone 12, and based on the second service brand, a reference to a second content is written over-the-air to a first random access memory 28 of the second mobile phone 12. The second content is one or more of a second turn-on splash screen associated with the second service brand, a second turn-on tone associated with the second service brand, a second turn-off splash screen associated with the second service brand, a second turn-off tone associated with the second service brand, a phone number of, a short code referencing, or other reference to a second voice mail service associated with the second service brand, and a universal reference locator (URL) of an on-line store associated with the second service brand.

Based on a first service brand of the mobile phone 12, in an embodiment the application 46 may write a parameter to the first random access memory 28 of the first mobile phone 12 over-the-air to enable a functionality of an embedded application installed in the first read only memory 26 of the mobile phone 12. For example, features specific to the first service brand of the mobile phone 12, such as the voice mail service, may be installed in firmware of the generic mobile phone 12 received from the manufacturer but disabled. The application 46 may enable the correct voice mail service upon identifying the first service brand during the provisioning process. In an embodiment, the application 46 further analyzes not only the first service brand of the mobile phone 12, but also the service plan associated to the mobile phone 12, and writes a reference to a first content based on the associated service plan. This may allow a service provider to deliver specific content to a user based on their service plan, for instance, a user with a limited data plan may receive content with menu items for video services removed.

The generic mobile phones 12 may be certified by a single certification process, thereby reducing certification costs for the original equipment manufacturer. In an embodiment, the generic mobile phone 12 has an Android execution platform installed, and the first content and the second content are certified for use on the Android execution platform. Because the first content and the second content are certified for the execution platform, they do not need to be recertified for the specific generic mobile phone model. In an embodiment, the generic mobile phones 12 are associated with one stock keeping unit number, enabling the service provider to leverage better economies of scale and simplified inventory management. Better economies of scale may be attained, for example, by buying one million units of the generic mobile phone 12 from an original equipment manufacturer rather than buying one hundred thousand units of each of ten different customized mobile phones from the same original equipment manufacturer. Likewise, better economies of scale may be attained in stocking inventory at retail stores and/or at distribution centers. For example, if it is customary to keep ten units of each different phone model on hand in a retail store and there are fifty different phone models, this equates to an inventory of five hundred phones. If the weekly turn over of phones is about one hundred, however, it may be possible to stock an inventory of two hundred generic phones and keep up with purchasing demand, but with a considerably reduced investment in inventory stock. Ordering phones to restore inventory becomes simpler because sales of fifty different models of phone do not have to be separately stocked. The same example may readily be applied to a distribution center, perhaps resulting in an even greater percentage of inventory reduction than could be realized in the case of the retail stores.

FIG. 1 illustrates a communication system 10 including a wireless communication link between the mobile phone 12 and the network 16. It should be noted that the service provisioning server 40 may also reside in a distribution center or warehouse, and that some or all provisioning events may be completed in the distribution center. This would allow branding and customization to be accomplished prior to sending a plurality of mobile phones 12 to a retail point of sale or a large enterprise customer, for example. In some embodiments, branding may further include installing a battery cover that features a surface mark associated with the appropriate brand. It is contemplated that such battery covers may be easily and inexpensively removed and replaced to rebrand a mobile phone, for example by removing a battery cover having a surface mark associated with a first brand and replacing with another battery cover having a surface mark associated with a second brand. The surface mark may comprise a painted mark, an incised mark, a mark impressed into the material of the battery cover, a mark molded into the material of the battery cover, a decal or sticker affixed to the battery cover, or other visible mark.

Figure 2:
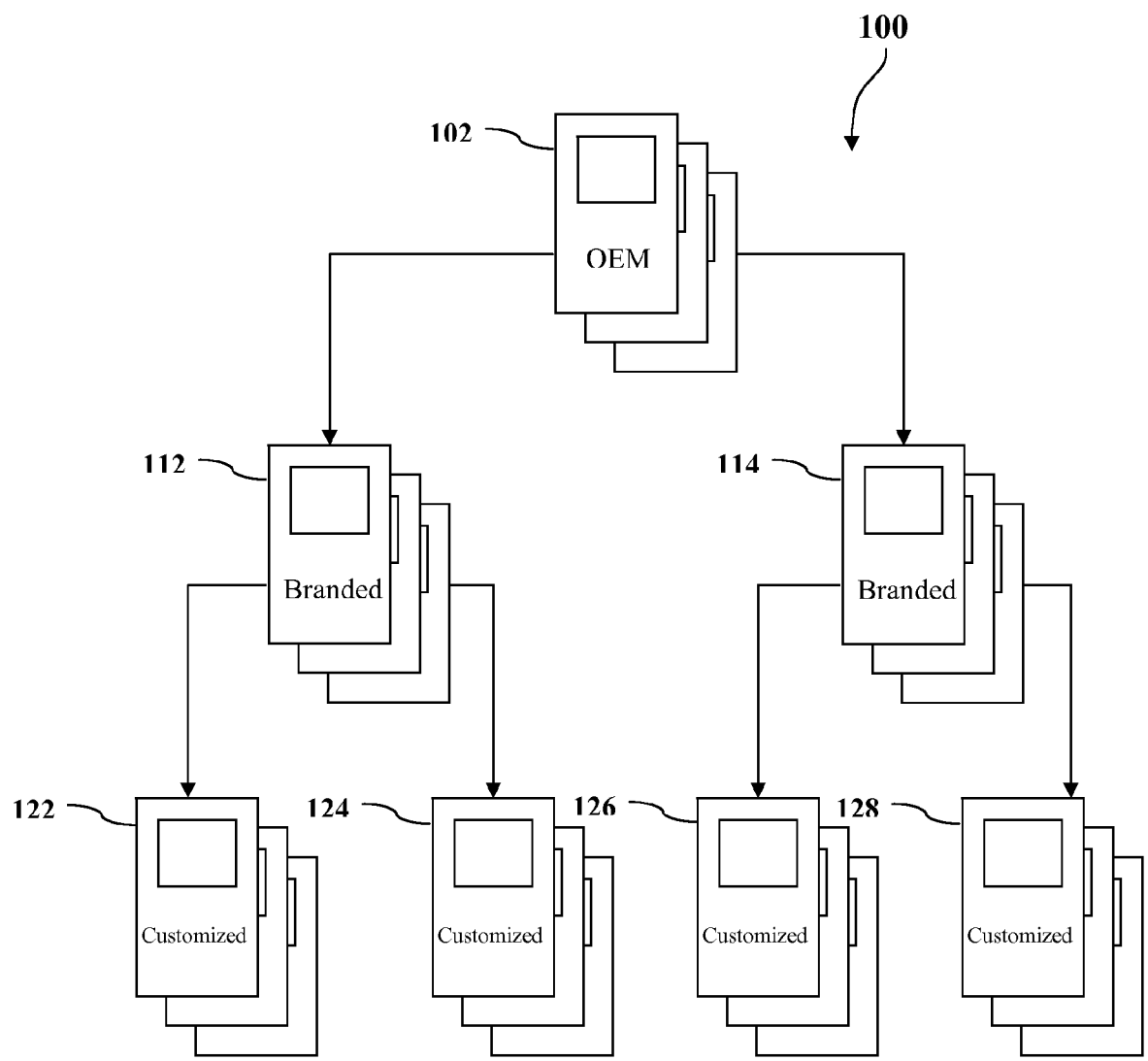
FIG. 2 is an illustration of the levels of device configuration according to an embodiment of the disclosure.

Turning now to FIG. 2, a hierarchy 100 illustrates devices in the configuration cycle, displaying how the provisioning process can take a generic device and transform it into a branded, customized device. The hierarchy 100 comprises a plurality of generic mobile phones 102, branching off to a plurality of first service brand mobile phones 112 and a plurality of second service brand mobile phones 114. The first service brand mobile phones 112 branch off into a plurality of first customized mobile phones 122 and a plurality of second customized mobile phones 124. The second service brand mobile phones 114 branch off into a plurality of third customized mobile phones 126 and a plurality of fourth customized mobile phones 128. The original equipment manufacturer can deliver a single generic configuration to a service provider, allowing a single certification and a single stock keeping unit. A service provider may support a plurality of brands. The service provider has the flexibility to utilize the provisioning process to update a plurality of generic mobile phones 102 and create a first plurality of branded mobile phones 112 and a second plurality of mobile branded phones 114, wherein the configuration is now unique for each brand. Additionally, within each brand further customization can be accomplished such that the first plurality of branded mobile phones 112 can be updated to create a first plurality of customized mobile phones 122 and a second plurality of customized mobile phones 124, and the second plurality of branded mobile phones 114 can be updated to create a third plurality of customized mobile phones 126 and a fourth plurality of customized mobile phones 128. For example, within a brand, the service provider may have requirements to customize a plurality of branded mobile phones 112 with specific applications for a large enterprise customer, or may want to target a particular customer demographic with a customized mobile phone model.

In an embodiment, a first branded mobile phone 112 is deactivated, having previously been activated. The first branded mobile phone 112 may be restored to factory generic mobile phone 102 settings from a first read only memory of the first branded mobile phone 112. The first generic mobile phone 102 may now be reactivated, and in response to reactivating the first generic mobile phone 102, a third service brand is automatically identified and associated with the first generic mobile phone 102. Based on the third service brand, a reference to a third content is written to the first memory area of the first generic mobile phone 102 over-the-air. In this manner a service provider can support transfer of inventory between brands without firmware reflashing. Current practice has mobile phones being delivered already branded in the firmware, with no means to make the phones generic or non-branded. A separate firmware would need to be loaded on the phones to re-brand them, making it a difficult and costly process to transfer inventory to another brand. In an embodiment, the factory generic mobile phone 102 settings are stored in the first read only memory of the first branded mobile phone 112 in compressed format.

In addition to the device configuration methods of customization described, similar processes may be implemented with regards to the hardware and packaging of a generic mobile phone 102. For example, the hardware branding of the device may be either completely removed, or moved from the face of the device to the battery cover, relying on software branding to persist the logo onscreen. A service provider would be able to change the hardware branding simply by changing the battery cover, increasing the flexibility and reducing the cost for the service provider to support multiple brands. Similarly, unbranded original equipment manufacturer generic mobile phones 102 may be inserted into unbranded packaging with a white space for warehouse printing or labeling upon warehouse fulfillment and branding.

Figure 3:
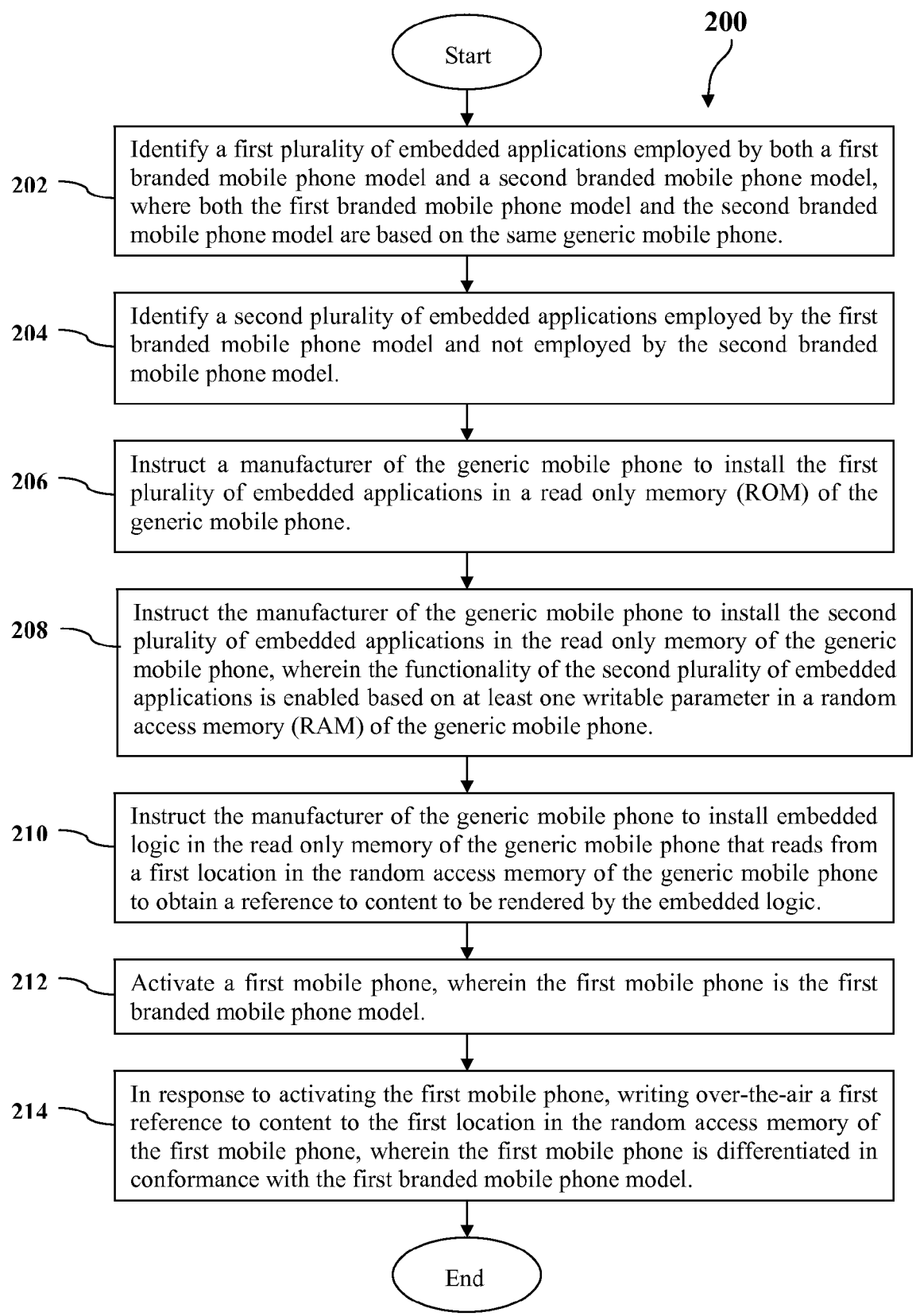
FIG. 3 is a flow chart of a method according to an embodiment of the disclosure.

In FIG. 3, a method 200 is described. At block 202 a first plurality of embedded applications employed by both a first branded mobile phone model and a second branded mobile phone model is identified, where both the first branded mobile phone model and the second branded mobile phone model are based on the same generic mobile phone. The same generic mobile phones may have the same firmware installed. The same generic mobile phones may have the same hardware or may have different hardware. For example, in an embodiment a first set of the generic mobile phones may comprise a first low cost camera device and a second set of the generic mobile phones may comprise a second high cost camera device. As another example, in an embodiment, a first set of the generic mobile phones may comprise a second speaker to promote a speaker phone operation mode and the second set of generic mobile phones may omit the second speaker. At block 204 a second plurality of embedded applications employed by the first branded mobile phone model and not employed by the second branded mobile phone model are identified. The first plurality of embedded applications comprise the common functionality that may be provided on all models of the mobile phones, while the second plurality of embedded applications may comprise functionality that is provided to a subset of the generic mobile phones and may be disabled on the generic mobile phone. When branding the mobile phones 12 to the subject model that delivers the functionality of the second plurality of embedded applications, the subject applications may be enabled by the provisioning server 40 or other device.

At block 206 the manufacturer of the generic mobile phone 12 is instructed, for example in a specification document, to install the first plurality of embedded applications in a read only memory 26 of the generic mobile phone. Any application or feature that is shared across all brands or sales channels may be included in the embedded applications compiled into the firmware of the generic mobile phone 12 as delivered from the device manufacturer. At block 208, the manufacturer of the generic mobile phone is instructed by the specification to install the second plurality of embedded applications in the read only memory 26 of the generic mobile phone 12 wherein the functionality of the second plurality of embedded applications is enabled based on at least one writable parameter in a random access memory 28 of the generic mobile phone. Any application that is unique to a brand or sales channel may be provided in the firmware installed in the generic mobile phone 12 but will be disabled in the default configuration delivered by the device manufacturer. At block 210, the manufacturer of the generic mobile phone 12 is instructed by the specification to install embedded logic in the read only memory 26 of the generic mobile phone 12 that reads from a first location in the random access memory of the generic mobile phone 12 to obtain a reference to content to be rendered by the embedded logic. The manufacturer installs all embedded applications to the generic mobile phone 12, along with the logic to enable the second plurality of embedded applications based on an on/off switch stored in random access memory 28. For example, the firmware may read from an appropriate location in random access memory 28 to determine whether a feature and/or functionality is enabled or disabled.

At block 212, a first mobile phone 12 is activated, where the first mobile phone 12 is the first branded mobile phone model. At block 214, in response to activating the first mobile phone 12, a first reference to content is written over-the-air to the first location in the random access memory 28 of the first mobile phone 12, where the first mobile phone 12 is differentiated in conformance with the first branded mobile phone model. As part of the initial over-the-air activation of the first mobile phone 12, the first service brand is identified and the locations of the on/off switch for the embedded applications associated with the first branded mobile phone model, for example picture mail or a voice mail provider, are written over-the-air to enable the appropriate embedded applications for the first service brand.

In an embodiment, the method 200 may further comprise activating a second mobile phone 12, where the second mobile phone 12 is the second branded mobile phone model. In response to activating the second mobile phone 12, a second reference to content is written over-the-air to the first location in the random access memory 28 of the second mobile phone 12. The first reference to content and the second reference to content are different, and the second mobile phone 12 is thereby differentiated from the first mobile phone 12 in conformance with the second branded mobile phone model. Stated another way, when the second mobile phone 12 is used, the firmware may read from the first location in the random access memory 28, follow the reference to content contained at the first location in memory to retrieve a content, and present the content, wherein the presented content is different from the corresponding content that would be presented on the first mobile phone 12. This differentiates the second mobile phone 12 from the first mobile phone 12, at least in part, in that the first mobile phone 12 may present different corresponding content, for example a different splash screen on start up, a different power-on tone, etc. As part of the initial over-the-air activation of the second mobile phone 12, the second service brand is identified and the locations of the on/off switch for the embedded applications associated with the second branded mobile phone model are written over-the-air to enable the appropriate embedded applications for the second service brand.

In an embodiment, the method 200 may comprise, in response to activating the first mobile phone 12, writing over-the-air to a second location in the random access memory 28 of the generic mobile phone 12 to enable one of the second plurality of embedded applications. Writing over-the-air to the second location in random access memory 28 of the generic mobile phone 12 is based at least in part on a first service brand associated with a communication service provided to the first mobile phone 12 after activating the first mobile phone 12. It is understood that the first memory area and the second memory area are at equivalent addresses in each of the first mobile phone 12 and the second mobile phone 12, and that the firmware is configured to read from the equivalent address to present the first content on the first mobile phone 12 when the firmware is executed on the first mobile phone 12 and to present the second content on the second mobile phone 12 when the firmware is executed on the second mobile phone 12.

In an embodiment, activating the first mobile phone 12 may also comprise at least one of provisioning an identity of the first mobile phone 12 into a mobile switching center (MSC), provisioning the identity of the first mobile phone 12 into a home location register (HLR), and provisioning the identity of the first mobile phone 12 into a visitor location register (VLR). The method may further comprise writing over-the-air a preferred roaming list (PRL) to a third location in the random access memory 28 of the first mobile phone 12, wherein the embedded logic further reads from the third location in the random access memory 28 of the first mobile phone 12 to one of originate a mobile phone call and receive a mobile phone call. Content referenced by the first reference to content may be one of a first service brand turn-on splash page, a first service brand turn-on tone, a first service brand turn-off splash page, a first service brand turn-off tone, and a first service brand logo.

In an embodiment, method 200 may further comprise removing a first battery cover from the first mobile phone, wherein an exterior of the first battery cover has a first service brand mark associated with the first service brand and installing a second battery cover on the first mobile phone, wherein an exterior of the second battery cover has a different service brand mark associated with a different service brand.

Figure 4:
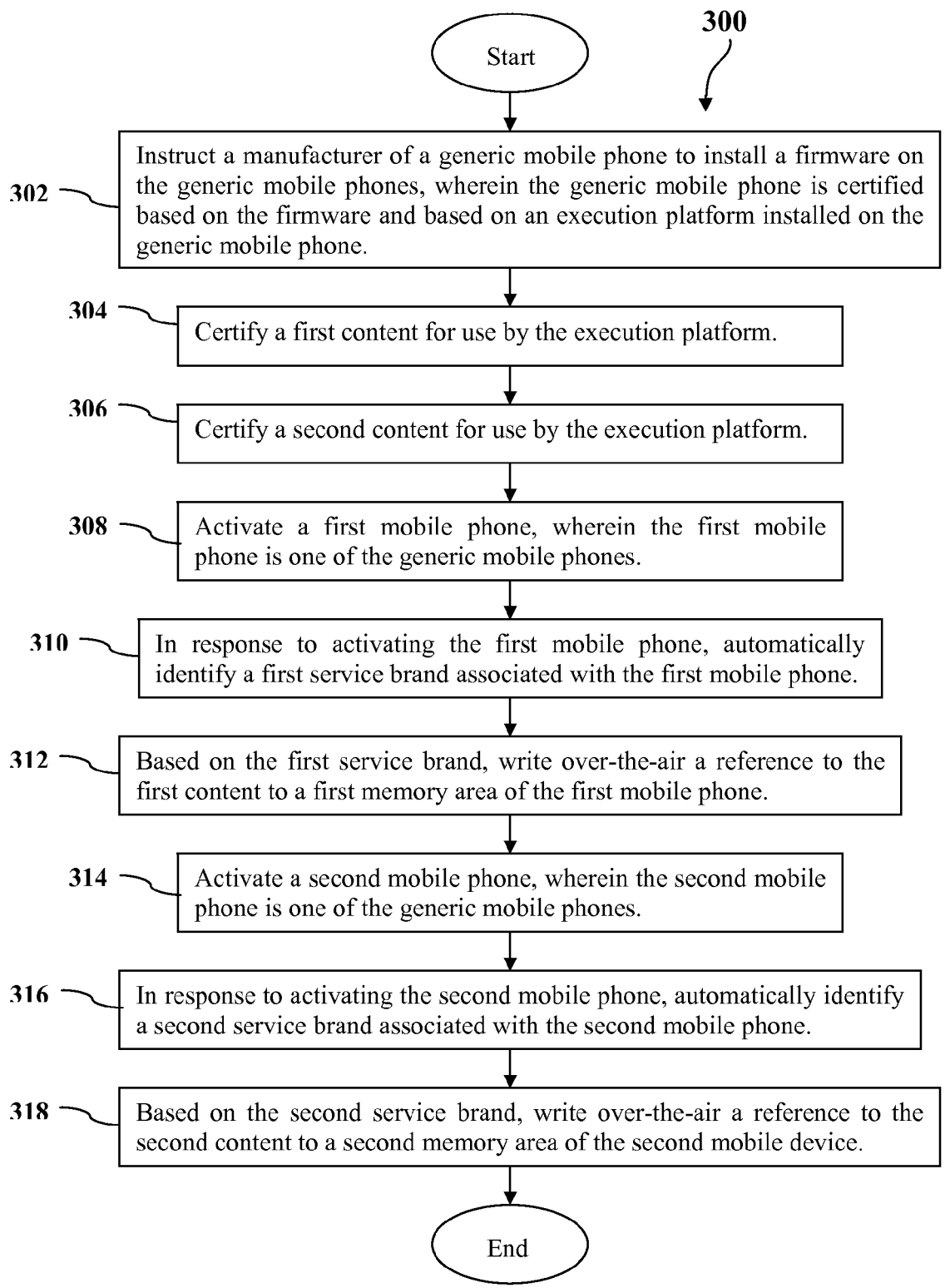
FIG. 4 is a flow chart of a method according to an embodiment of the disclosure.

Turning now to FIG. 4, a method 300 is described. At block 302, the manufacturer of a generic mobile phone 12 is instructed, for example by a specification, to install a firmware or generic firmware on the generic mobile phones where the generic mobile phone 12 is certified based on the generic firmware and based on an execution platform installed on the generic mobile phone 12. It is understood that the firmware installed on each of the plurality of generic mobile phones 12 is the same. In an embodiment, the hardware of the generic mobile phones 12 is substantially the same, but in another embodiment, there may be hardware differences among the generic mobile phones 12 that are loaded with the same generic firmware. This allows a manufacturer to deliver a single generic mobile phone model needing only a single certification, that is certification of the generic firmware, reducing the overhead costs of the device. By way of contrast, under other circumstances, each unique configuration resulting in a unique firmware and/or unique binary might need a separate certification. At block 304 a first content is certified for use by the execution platform. At block 306 a second content is certified for use by the execution platform. Because the first and second content are tested and certified against the execution platform and not the generic firmware, they may be used on other mobile phone models running the same execution platform, and the firmware that is installed on the generic mobile phone 12 is not changed and does not need re-certification with each set of unique content.

At block 308, a first mobile phone 12 is activated, where the first mobile phone 12 is one of the generic mobile phones. At block 310, in response to activating the first mobile phone 12, a first service brand associated with the first mobile phone 12 is automatically identified. At block 312, based on the first service brand, a reference to the first content is written over-the-air to a first memory area of the first mobile phone 12. In this manner, the content associated with the first service brand is enabled. At block 314, a second mobile phone 12 is activated, where the second mobile phone 12 is one of the generic mobile phones. At block 316, in response to activating the second mobile phone 12, a second service brand associated with the second mobile phone 12 is automatically identified. At block 318, based on the second service brand, a reference to the second content is written over-the-air to a second memory area of the second mobile phone 12. Based on the service brand associated with the mobile phone, the service provider is able to update the generic mobile phone into a branded mobile phone by enabling the appropriate applications at activation.

In an embodiment, the generic mobile phone 12 may be certified in accordance with federal communication commission (FCC) regulations. In an embodiment, the execution platform may be one of an Android execution platform, a JAVA virtual machine, a Symbian execution platform, a BREW execution platform, a WebOS execution platform, a Mobile Explorer platform, or any other mobile device operating system, whether currently known or not yet in existence. In an embodiment, the first content is a customization pack that identifies at least one of a first service brand turn-on splash screen reference, a first service brand turn-on tone reference, a first service brand turn-off splash screen, a first service brand turn-off tone reference, a first service brand logo reference, a first service brand voice mail reference, and a first service brand on-line store reference.

Figure 5:
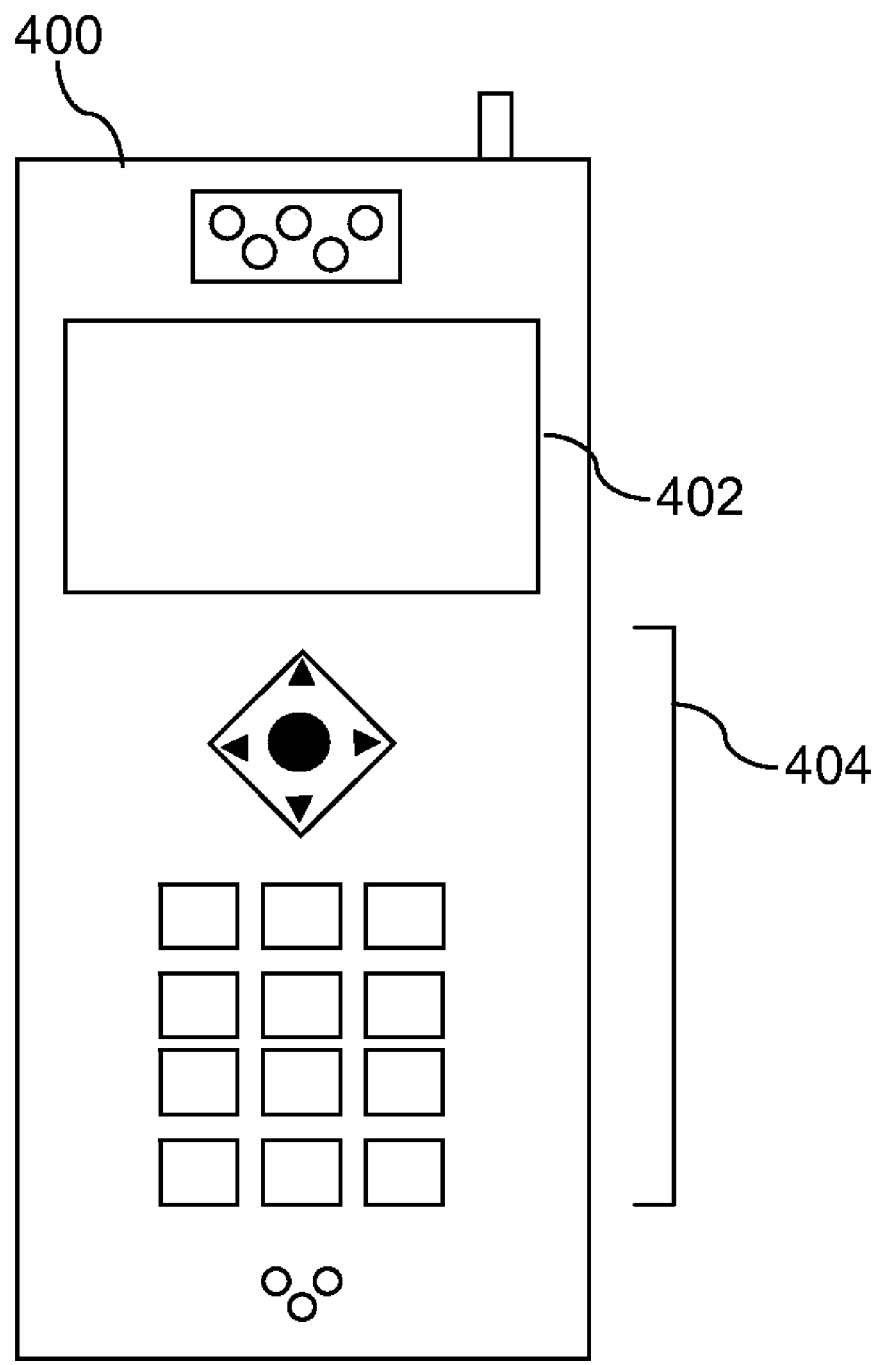
FIG. 5 is an illustration of a mobile device according to an embodiment of the disclosure.

FIG. 5 shows a mobile device 400. FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 400 is not a general purpose computing device like a portable, laptop or tablet computer, but rather is a special-purpose communications device such as a mobile phone, wireless handset, pager, or PDA. The mobile device 400 may support specialized activities such as gaming, inventory control, job control, and/or task management functions, and so on.

The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400.

Figure 6:
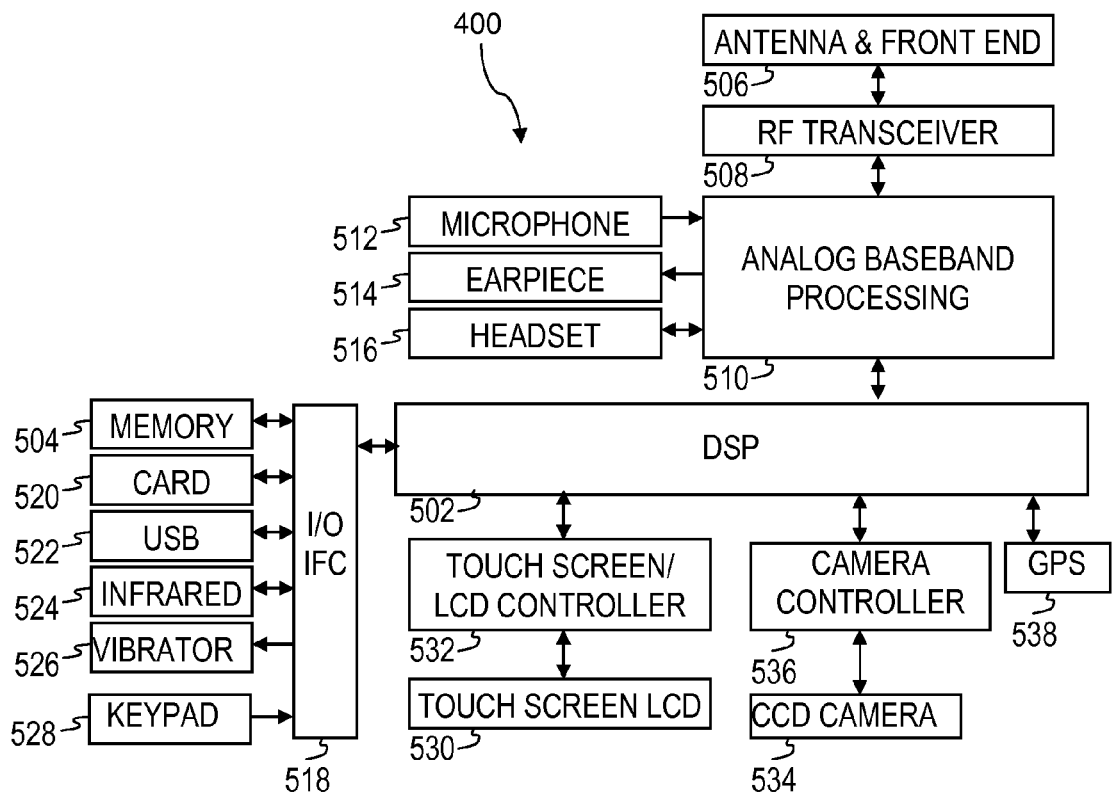
FIG. 6 is a block diagram of a mobile device according to an embodiment of the disclosure.

FIG. 6 shows a block diagram of the mobile device 400. While a variety of known components of handsets 400 are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a radio access network (RAN) or some other available wireless communications network or from a peer mobile device 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 400 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526 that, when triggered, causes the mobile device 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. In another embodiment, a camera operating according to a technology other than charge coupled device cameras may be employed. Various other peripherals also may be included to provide additional functions, e.g., radio and television reception.

Figure 7:
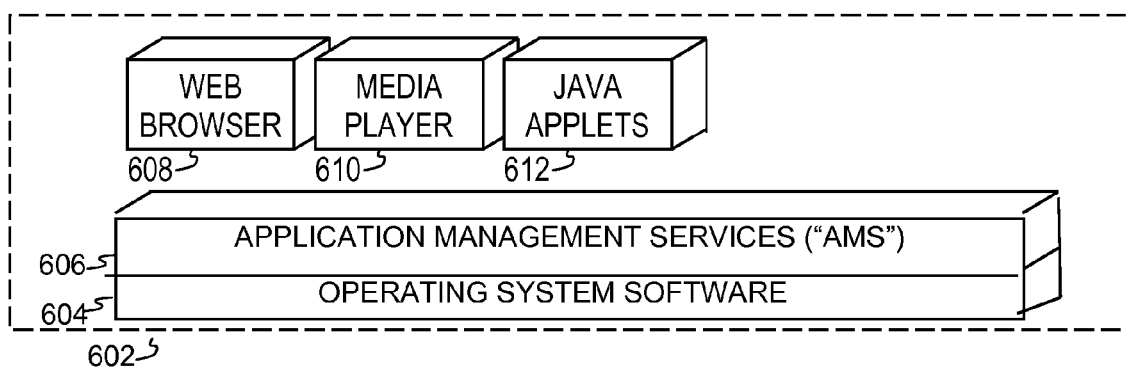
FIG. 7 is a block diagram of a software architecture for a mobile device according to an embodiment of the disclosure.

FIG. 7 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 400. Also shown in FIG. 7 are a web browser application 608, a media player application 610, and JAVA applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The JAVA applets 612 configure the mobile device 400 to provide games, utilities, and other functionality.

Figure 8:
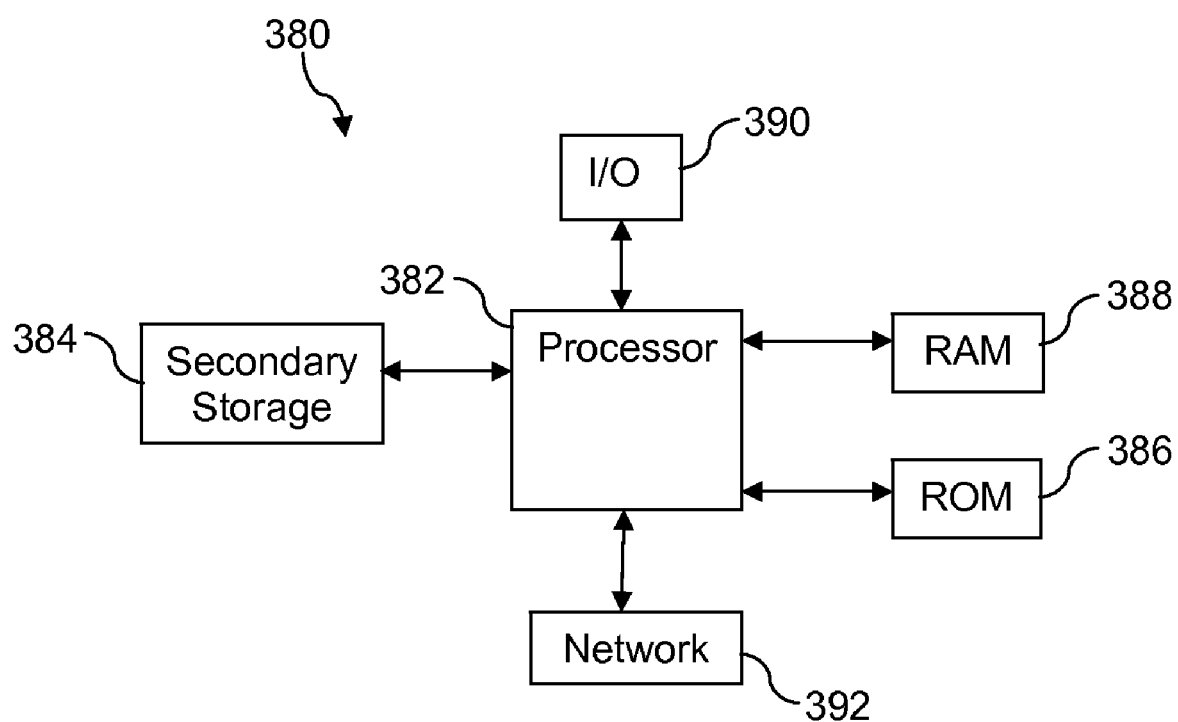
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A method of providing wireless communication service to a mobile phone, comprising:
identifying a first plurality of embedded applications employed by both a first branded mobile phone model and a second branded mobile phone model, where both the first branded mobile phone model and the second branded mobile phone model are based on the same generic mobile phone;

identifying a second plurality of embedded applications employed by the first branded mobile phone model and not employed by the second branded mobile phone model;

instructing a manufacturer of the generic mobile phone to install the first plurality of embedded applications in a read only memory (ROM) of the generic mobile phone;

instructing the manufacturer of the generic mobile phone to install the second plurality of embedded applications in the read only memory of the generic mobile phone, wherein the functionality of the second plurality of embedded applications is enabled based on at least one writeable parameter in a random access memory (RAM) of the generic mobile phone;

instructing the manufacturer of the generic mobile phone to install embedded logic in the read only memory of the generic mobile phone that reads from a first location in the random access memory of the generic mobile phone to obtain a reference to content to be rendered by the embedded logic;

activating a first mobile phone, wherein the first mobile phone is the first branded mobile phone model, and wherein activating the first mobile phone comprises at least one of provisioning an identify of the first mobile phone into a mobile switching center (MSC), provisioning the identify of the first mobile phone into a home location register (HLR), and provisioning the identity of the first mobile phone into a visitor location register (VLR);

in response to activating the first mobile phone, writing over-the-air a first reference to content to the first location in the random access memory of the first mobile phone, wherein the first mobile phone is differentiated in conformance with the first branded mobile phone model; and writing over-the-air a preferred roaming list (PRL) to a third location in the random access memory of the first mobile phone, wherein the embedded logic further reads from the third location in the random access memory of the first mobile phone to one of originate a mobile phone call and receive a mobile phone call.

2. The method of claim 1, further comprising:

activating a second mobile phone, wherein the second mobile phone is the second branded mobile phone model; and in response to activating the second mobile phone, writing over-the-air a second reference to content to the first location in the random access memory of the second mobile phone, wherein the first reference to content and the second reference to content are different and wherein the second mobile phone is differentiated in conformance with the second branded mobile phone model.

3. The method of claim 1, further comprising, in response to activating the first mobile phone, writing over-the-air to a second location in the random access memory of the generic mobile phone to enable one of the second plurality of embedded applications.

4. The method of claim 3, wherein writing over-the-air to the second location in the random access memory of the generic mobile phone is based at least in part on a first service brand associated with a communication service provided to the first mobile phone after activating of the first mobile phone.

5. The method of claim 1, wherein the content referenced by the first reference to content is one of a first service brand turn-on splash page, a first service brand turn-on tone, a first service brand turn-off splash page, a first service brand turn-off tone, and a first service brand logo.

6. A method of providing wireless communication service to a mobile phone, comprising:

instructing a manufacturer of a generic mobile phone to install a firmware on generic mobile phones, wherein the generic mobile phone is certified based on the firmware and based on an execution platform installed on the generic mobile phone;

certifying a first content for use by the execution platform;

certifying a second content for use by the execution platform;

activating a first mobile phone, wherein the first mobile phone is one of the generic mobile phones;

in response to activating the first mobile phone, automatically identifying a first service brand associated with the first mobile phone;

based on the first service brand, writing a reference to the first content to a first memory area of the first mobile device over-the-air;

activating a second mobile phone, wherein the second mobile phone is one of the generic mobile phones;

in response to activating the second mobile phone, automatically identifying a second service brand associated with the second mobile phone;

based on the second service brand, writing a reference to the second content to a second memory area of the second mobile device over-the-air;

deactivating the first mobile phone;

restoring the first mobile phone to factory generic mobile phone settings from a first read only memory of the first mobile phone;

reactivating the first mobile phone;

in response to reactivating the first mobile phone, automatically identifying a third service brand associated with the first mobile phone;

based on the third service brand, writing a reference to a third content to the first memory area of the first mobile device over-the-air;

removing a first battery cover from the first mobile phone, wherein an exterior of the first battery cover has a first service brand mark associated with the first service brand; and installing a second battery cover on the first mobile phone, wherein an exterior of the second battery cover has a second service brand mark associated with the third service brand.

7. The method of claim 6, wherein the first memory area and the second memory area are at equivalent addresses in each of the first and second mobile phone, and wherein the firmware is configured to read from the equivalent address to present the first content on the first mobile phone when the firmware is executed on the first mobile phone and to present the second content on the second mobile phone when the firmware is executed on the second mobile phone.

8. The method of claim 6, wherein the execution platform is one of an Android execution platform, a JAVA virtual machine, a Symbian execution platform, a BREW execution platform, a WebOS execution platform, and a Mobile Explorer execution platform.

9. The method of claim 6, wherein the first content is customization pack that identifies at least one of a first service brand turn-on splash screen reference, a first service brand turn-on tone reference, a first service brand turn-off splash screen reference, a first service brand turn-off tone reference, a first service brand logo reference, a first service brand voice mail reference, and a first service brand on-line store reference.

10. A service awareness provisioning server, comprising:
an at least one processor;
a memory; and
an application stored in the memory that, when executed by the at least one processor,
  receives a first activation message from a first mobile phone, the first mobile phone being one of a plurality of generic mobile phones, wherein each of the plurality of generic mobile phones have a common firmware installed,
  in response to the first activation message, identifies a first service brand associated with the first mobile phone,
  based on the first service brand, writing a reference to a first content to a memory of the first mobile phone over-the-air, wherein the first content is one of a first turn-on splash screen associated with the first service brand, a first turn-on tone associated with the first service brand, a first turn-off splash screen associated with the first service brand, a first turn-off tone associated with the first service brand, a reference to a first voice mail service associated with the first service brand, and a universal reference locator (URL) of an on-line store associated with the first service brand,
  receives a second activation message from a second mobile phone, the second mobile phone being one of the plurality of generic mobile phones,
  in response to the second activation message, identifies a second service brand associated with the second mobile phone, and
  based on the second service brand, writing a reference to a second content to a memory of the second mobile phone over-the-air, wherein the second content is one of a second turn-on splash screen associated with the second service brand, a second turn-on tone associated with the second service brand, a second turn-off splash screen associated with the second service brand, a second turn-off tone associated with the second service brand, a reference to a second voice mail service associated with the second service brand, and a universal reference locator (URL) of an on-line store associated with the second service brand, wherein the generic mobile phones have an android execution platform installed, and wherein the first content and the second content are certified for use on the android execution platform.

11. The server of claim 10, wherein the server comprises a plurality of processors located in a plurality of computers.

12. The server of claim 10, wherein the application further, based on the first service brand, writes a parameter to the memory of the first mobile phone over-the-air to enable a dormant functionality of a firmware installed on the generic mobile phones.

13. The server of claim 10, wherein the application further analyzes a service plan associated to the first mobile phone, and wherein the application writes the reference to the first content based at least in part on the service plan associated to the first mobile phone.

14. The server of claim 10, wherein the generic mobile phones are certified by a single certification process.

15. The server of claim 10, wherein the generic mobile phones are associated with one stock keeping unit (SKU) number.

* * * * *